US010752148B2

(12) United States Patent
Selzer et al.

(10) Patent No.: US 10,752,148 B2
(45) Date of Patent: Aug. 25, 2020

(54) LATCHING ASSEMBLY FOR A TILT BED TRAILER

(71) Applicant: Brandt Industries Ltd., Regina (CA)

(72) Inventors: Mark Selzer, Regina (CA); Raymond Strelic, Regina (CA); Rod Sawcyn, Regina (CA)

(73) Assignee: Brandt Industries Ltd., Regina (CA)

( * ) Notice: Subject to any disclaimer, the term of this patent is extended or adjusted under 35 U.S.C. 154(b) by 181 days.

(21) Appl. No.: 15/617,156

(22) Filed: Jun. 8, 2017

(65) Prior Publication Data

US 2018/0093602 A1 Apr. 5, 2018

(30) Foreign Application Priority Data

Oct. 5, 2016 (CA) .................................. 2944265

(51) Int. Cl.
*B60P 1/43* (2006.01)
*B60P 1/24* (2006.01)
*B60P 1/28* (2006.01)

(52) U.S. Cl.
CPC .................. *B60P 1/24* (2013.01); *B60P 1/433* (2013.01); *B60P 1/28* (2013.01)

(58) Field of Classification Search
CPC ........... B62D 53/062; B60P 1/433; B60P 1/00
USPC ....................................................... 414/482
See application file for complete search history.

(56) References Cited

U.S. PATENT DOCUMENTS

| 7,401,804 B1* | 7/2008 | Rupp | B60P 1/027 280/43.1 |
| 8,272,829 B1* | 9/2012 | Rupp | B60P 1/027 414/482 |
| 2004/0105743 A1* | 6/2004 | Franklund | B60P 3/122 414/482 |
| 2011/0064542 A1* | 3/2011 | Hertzog | A01D 90/083 414/24.5 |

FOREIGN PATENT DOCUMENTS

| CA | 2944265 A1 | 4/2018 |
| CA | 2970085 A1 | 4/2018 |

* cited by examiner

*Primary Examiner* — Saul Rodriguez
*Assistant Examiner* — Willie Berry, Jr.
(74) *Attorney, Agent, or Firm* — Frost Brown Todd LLC; Nicole M. Tepe (57) ABSTRACT

A tilt bed trailer is provided with a latching system to secure the tilt bed in a transport position. The tilt bed trailer can have a frame with a first side rail and a second side rail. Ground wheels can be attached to the frame. A tilting bed portion can have a first pivoting rail and a second pivoting rail provided inside the first side rail and the second side rail and pivotally connected to the side rails so that the tilting bed portion can pivot relative to the frame around a pivot axis. A keeper can extend laterally from at least one of the pivoting rails. A latching assembly can include a rod extending between the side rails, a lever connected to the rod and at least one latching member engageable with the keeper. A biasing element can be provided to place a torsional force on the rod.

13 Claims, 8 Drawing Sheets

LATCHING ASSEMBLY FOR A TILT BED TRAILER

CROSS-REFERENCE TO RELATED APPLICATION

This application claims priority to and benefit of CA Serial No. 2,944,265, filed Oct. 5, 2016, the contents of which are incorporated by reference in its entirety for all purposes.

FIELD OF THE INVENTION

The present invention relates to latching assembly for a tilt bed trailer and more particularly to a latching assembly for holding a tilting bed portion of the trailer in a transport position.

BACKGROUND

Tilt bed trailers are commonly used to transport skid steers and other vehicles. The tilt bed portion of the trailer can be tilted so that it forms a ramp the vehicle can be driven up and then can rotated flat forming part of the flat deck the vehicle will sit on during transport.

There are a number of ways the tilt bed portion of a tilt bed trailer can be secured down for transport and then allowed to tilt up but they usually require a number of steps to unlatch. Other systems that are easy to unlatch may not adequately secure the tilt bed in the downward position.

BRIEF SUMMARY

In one aspect, a tilt bed trailer is provided. The tilt bed trailer can include: a frame having a front end and a back end, the frame comprising a first side rail and a second side rail, the first side rail spaced apart and parallel to the second side rail; a hitch attachment connected to the front end of the frame; ground wheels attached to the frame; a tilting bed portion comprising a first pivoting rail and a second pivoting rail, the first pivoting rail spaced apart and parallel to the second pivoting rail, the first pivoting rail provided adjacent to and inside the first side rail and pivotally connected to the first side rail, the second pivoting rail provided adjacent to and inside the second side rail and pivotally connected to the second side rail, such that the tilting bed portion can pivot relative to the frame around a pivot axis, the tilting bed portion extending behind the back end of the frame; a keeper extending laterally from one of the first pivoting rail and the second pivoting rail; and a latching assembly. The latching assembly can include: a rod extending between the first side rail and the second side rail; a lever connected to the rod; at least one latching member connected to the rod and engageable with the keeper; and a biasing element placing a torsional force on the rod and forcing the at least one latching member against the keeper.

BRIEF DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
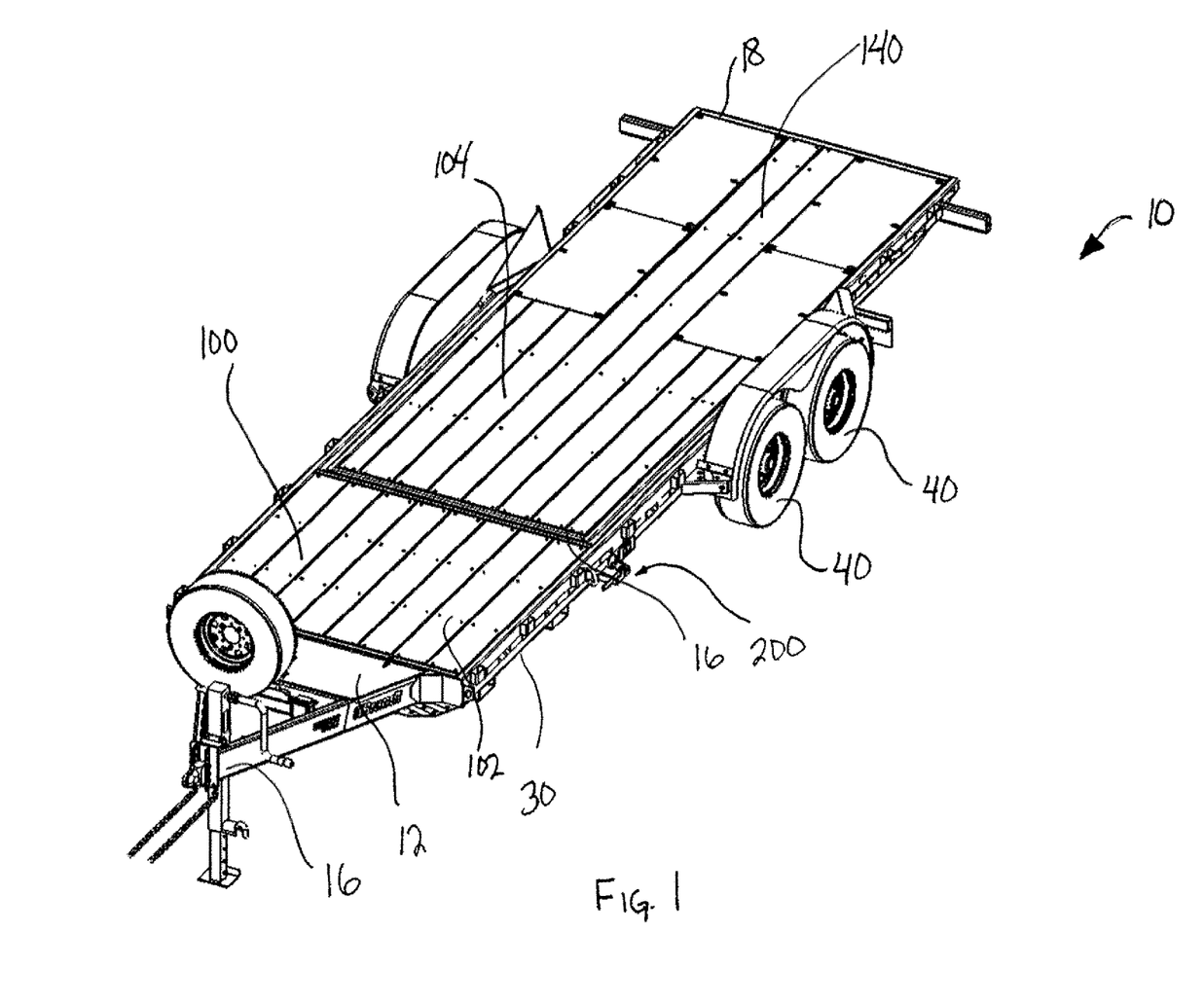
FIG. 1 is a perspective view of a tilt bed trailer having a latch assembly for the tilting bed portion.

FIG. 1 illustrates a tilt bed trailer 10 which can be used to load equipment such as skid steers, compact tractor, etc. for transport. The trailer 10 can have a chassis with a frame 30 and wheels 40, a fixed bed portion 100 and a tilting bed portion 140.

Figure 2:
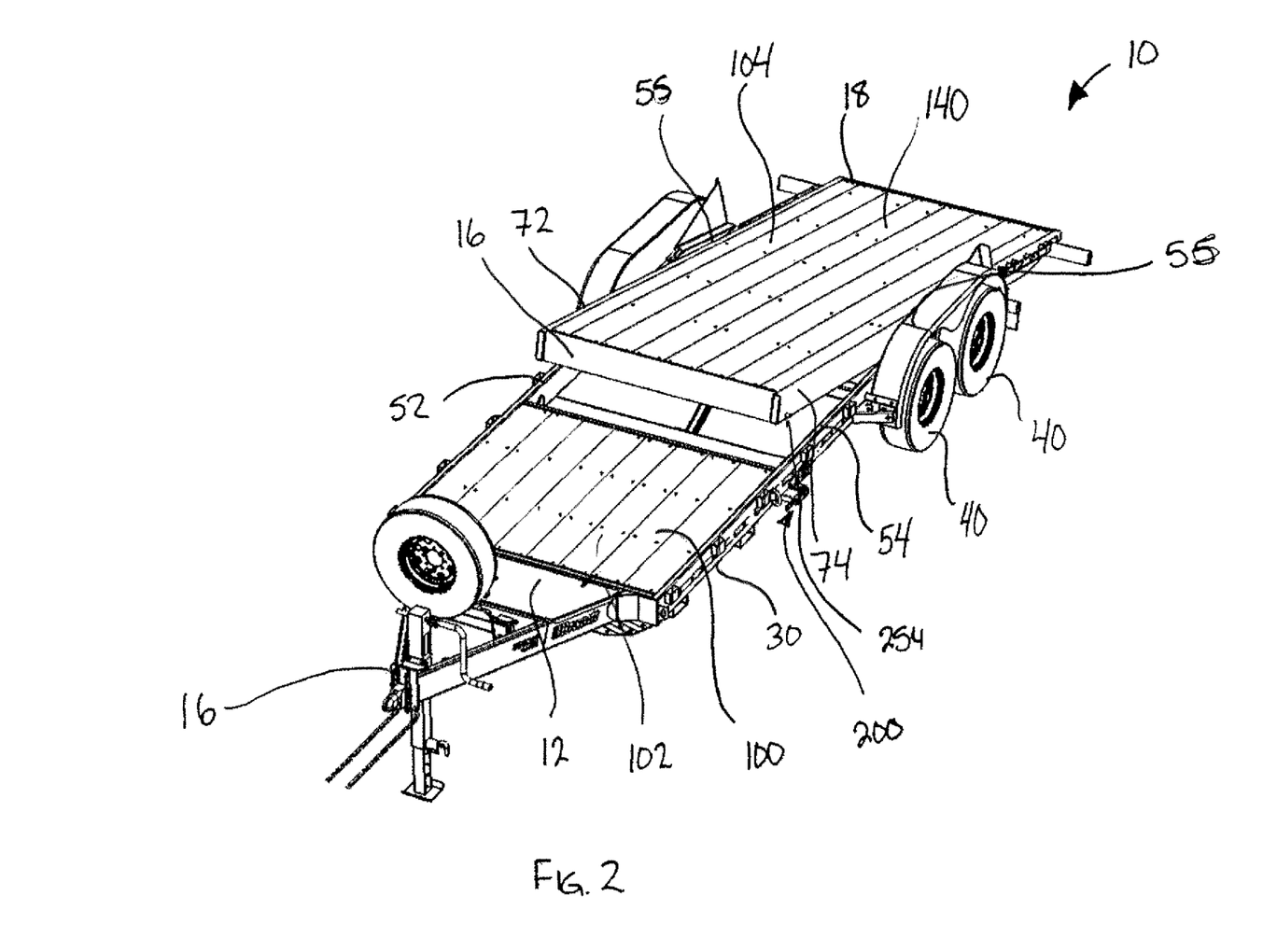
FIG. 2 is a perspective view of the tilt bed trailer of FIG. 1 with the tilting bed portion positioned in a loading position.

The trailer 10 can have a front end and a back end with a hitch attachment 16 so that the trailer 10 can be hitched to a tow vehicle (not shown) for towing the trailer 10. The fixed bed portion 100 can be provided proximate the front end 12 of the trailer 10 while the tilting bed portion 140 can be provided proximate the back end 18 of the trailer 10. The tilting bed portion 140 can be rotatably connected to the rest of the trailer 10 at connection points 56 so that the tilting bed portion 140 can be rotated relative to frame 30 around a pivot axis between a first position or transport position (as shown in FIG. 1) where the tilting bed portion 140 lies flat and substantially in the same plane as the fixed bed portion 100 and a second position or loading position (as shown in FIG. 2) where the tilting bed portion 140 is tilted relative to the rest of the trailer 10. In the loading position, the tilting bed portion 140 is tilted relative to the rest of the trailer 10 so that a back end 18 of the tilting bed portion 140 is close to or resting on a ground surface. In some cases, extension ramps may be used to allow a vehicle to drive up on to the back end 18 of the tilting bed portion 140. In the loading position, a vehicle (not shown), such as a skid steer, can be driven up the tilted bed portion 140 like a ramp and up onto the trailer 10. As the vehicle being driven up the tilting bed portion 140 moves from the back end 18 of the tilting bed portion 140 towards the front end 16 of the tilting bed portion 140, the vehicle passes over the pivot axis and the weight of the vehicle as the vehicle starts to pass the pivot axis will cause the tilting bed portion 140 of the trailer 10 to rotate back into the first position with the fixed bed portion 100 and the tilted bed portion 140 once again positioned in the same plane. The vehicle can then be driven further onto the trailer 10 so that the vehicle is supported on both the fixed bed portion 100 and the tilting bed portion 140.

Figure 3:
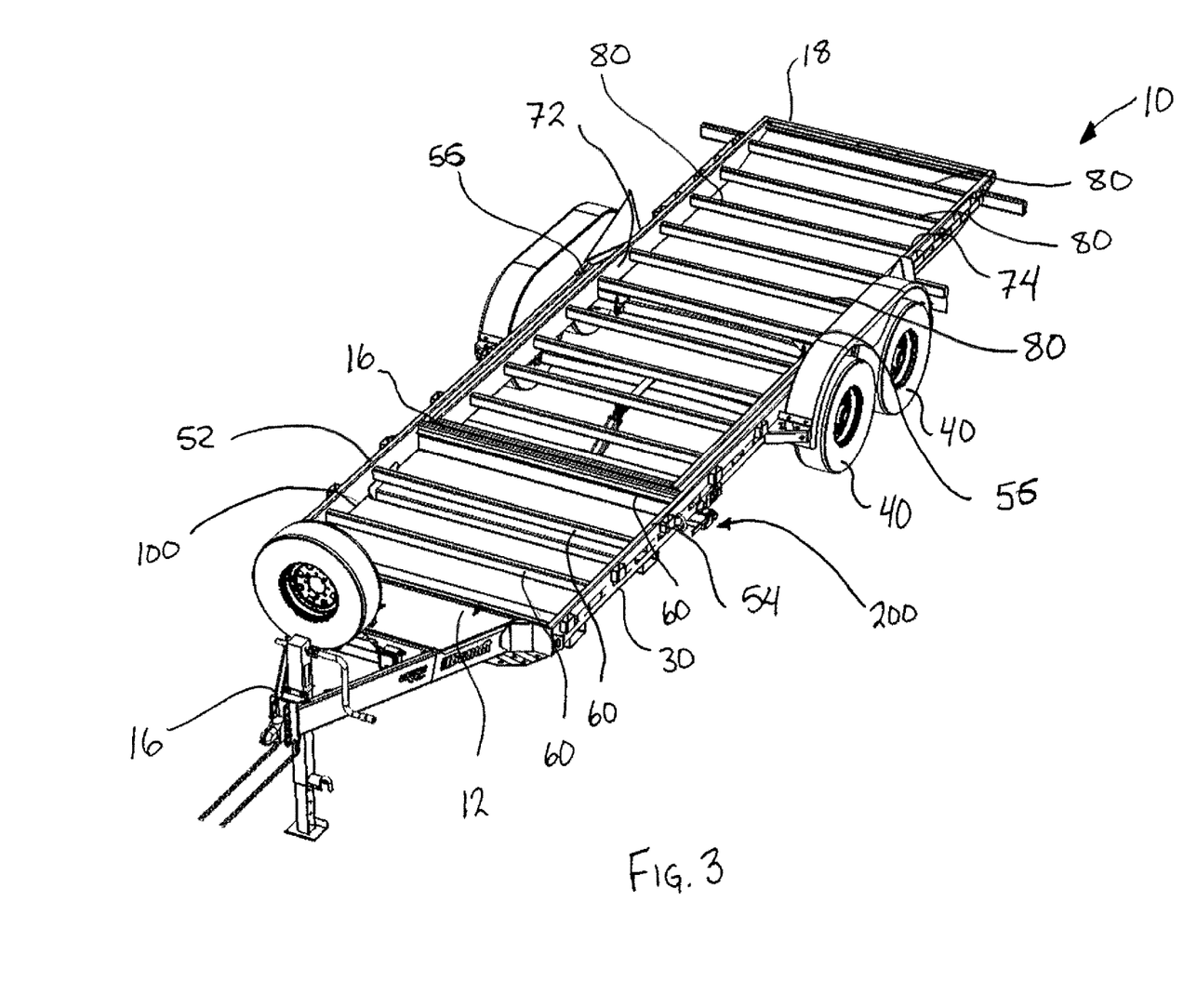
FIG. 3 is a perspective view of the trailer of FIG. 1 with the decking removed to show the underlying structure.
Figure 4:
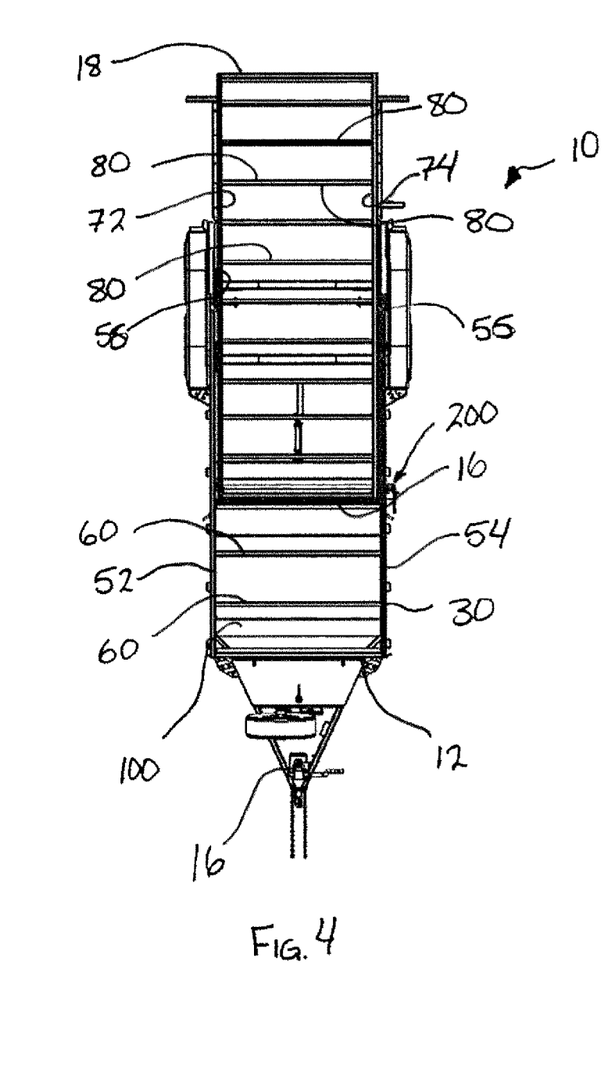
FIG. 4 is a top view of the trailer of FIG. 1 with the decking removed to show the underlying structure.
Figure 5:
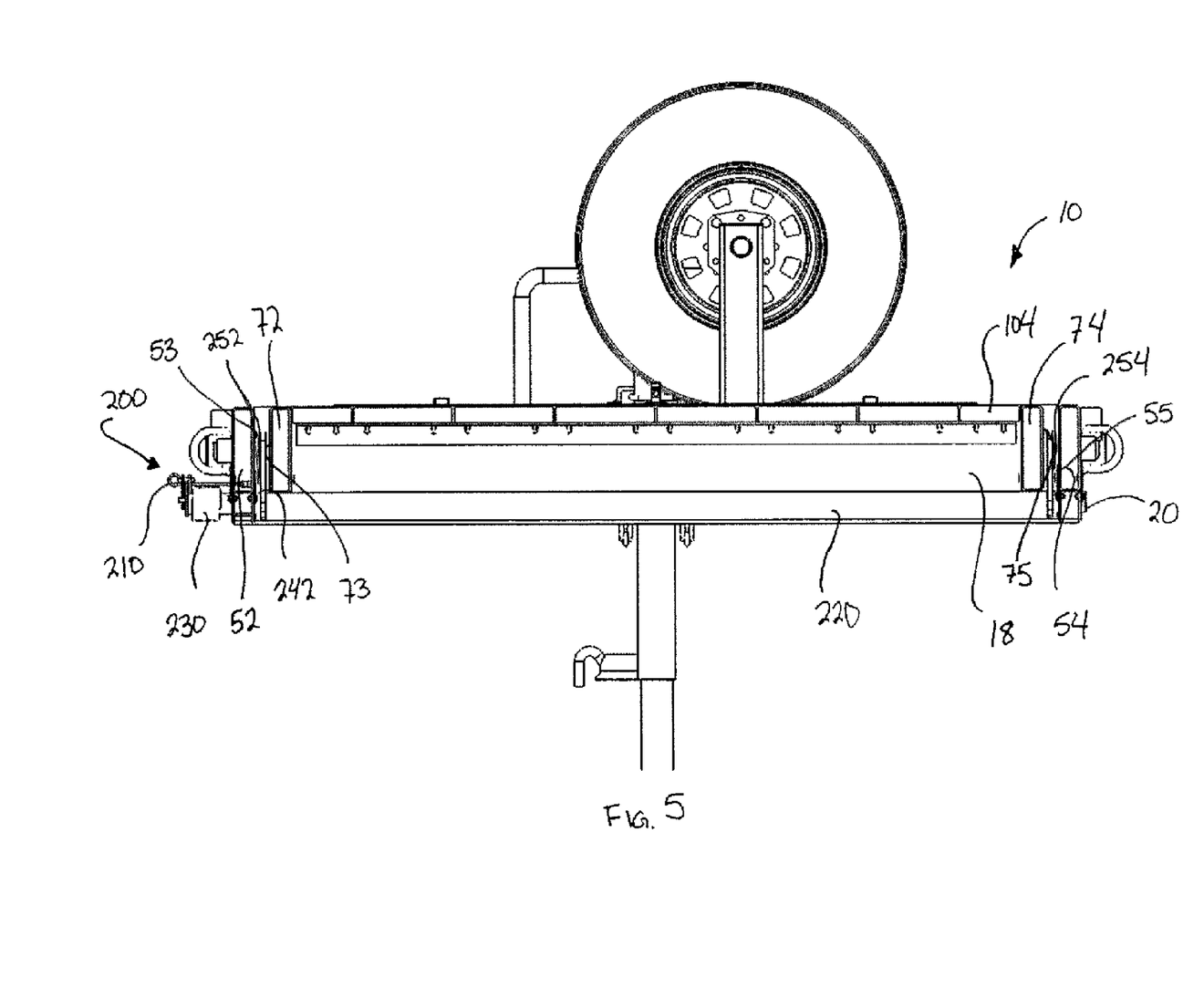
FIG. 5 is a rear view of the trailer of FIG. 1.

Referring to FIGS. 3 and 4, the frame 30 can be made up of two parallel-spaced side rails, the first side rail 52 and the second side rail 54. The hitch attachment 16 can be provided at a front end 12 of the frame 30. Fixed bed cross members 60 can be positioned laterally between the first side rail 52 and the second side rail 54. The fixed bed cross members 60 can extend between the first side rail 52 and the second side rail 54 under the portion of the trailer 10 that forms the fixed bed portion 100. Decking 102 such as metal sheeting, plywood, etc. can be placed over the fixed bed cross members 60 in the fixed bed portion 100 and these fixed bed cross members 60 along with the first side rail 52 and second side rail 54 can support the decking 102 making up the deck of the fixed bed portion 100 of the trailer 10. In a further aspect, the entire bed of the trailer could be made to tilt so that a fixed bed portion is not present, but rather the whole bed tilts and forms the ramp.

The tilting bed portion 140 can be formed of two parallel-spaced pivoting rails; a first pivoting rail 72 and a second pivoting rail 74, tilting bed cross members 80 and decking 104. The first side rail 52 and the second side rail 54 can continue to extend towards the back end of the trailer 10 beyond where the fixed bed cross members 60 are positioned between the first side rail 52 and the second side rail 54 to form the fixed deck portion 100 of the trailer 10. The first pivot rail 72 and the second pivot rail 74 can be positioned between the first side rail 52 and the second side rail 54 with the first pivot rail 72 provided adjacent to and inside the first side rail 52 so that an outer surface 73 of the first pivot rail 72 faces an inner surface 53 of the first side rail 52 and the second pivot rail 74 provided adjacent to and inside the second side rail 54 so that an outer surface 75 of the second pivot rail 74 faces an inner surface 55 of the second side rail 54. The first pivot rail 72 can be pivotally connected to the first side rail 52 at the connection point 56 and the second pivot rail 74 can be pivotally connected to the second side rail 54 at the connection point 56. The pivotal connection of the first pivoting rail 72, the first side rail 52, the second pivoting rail 74 and the second side rail 54 cause the tilt bed portion 140 to rotate around the pivot axis. When the tilt bed trailer 10 is positioned in the transport position, the first pivoting rail 72 and the second pivoting rail 74 can be positioned inside and adjacent to the inner surfaces of the first side rail 52 and the second side rail 54, respectively. The tilting bed cross members 80 can be provided extending laterally between the first pivoting rail 72 and the second pivoting rail 74. Decking 104, such as sheet metal, treated wood, plywood, etc., can be provided over the tilting bed cross members 80 to form the tilting bed portion 140 of the trailer 10.

The back end 18 of the tilting bed portion 140 can extend past the back end of the frame 30 and specifically the back ends of the first side rail 52 and the second side 54. Depending on where the tilting bed portion 140 is rotatably connected at the connection points 56 to the first side rail 52 and the second side rail 54 and therefore where the pivot axis is positioned relative to the frame 30, will determine how easy it is to get the tilting bed portion 140 to tilt. By placing the pivot axis of the tilting bed portion 140 at the center of gravity of the tilting bed portion 140, the tilting bed portion 140 can be made to balance in place requiring additional weight to be placed closer to either the front end 16 or back end 18 of the tilting bed portion 140 to get the tilting bed portion 140 to tilt. By placing the pivot axis closer to the back end 18 of the tilting bed portion 140 than the front end 16, so that the pivot axis is between the center of gravity and the back end 18 of the tilting bed portion 140, the tilting bed portion 140 can be biased to remain in the first position with the tilting bed portion 140 remaining flat with the fixed bed portion 110. Alternatively, by positioning the pivot axis closer to the front end 16 of the tilting bed portion 140 than the back end 18, so that the pivot axis is between the center of gravity of the tilting bed portion 140 and the front end 16 of the tilting bed portion 140, the tilting bed portion 140 can be biased to tilt backwards into the second position or loading position.

The tilting bed portion 140 can be held in the transport position using a latching assembly 200. The latching assembly 200 can be provided on the trailer 10 to hold the front end 16 of the tilting bed portion 140 in place; keeping the tilting bed portion 140 aligned with the fixed bed portion 100 as shown in FIG. 1.

Figure 6:
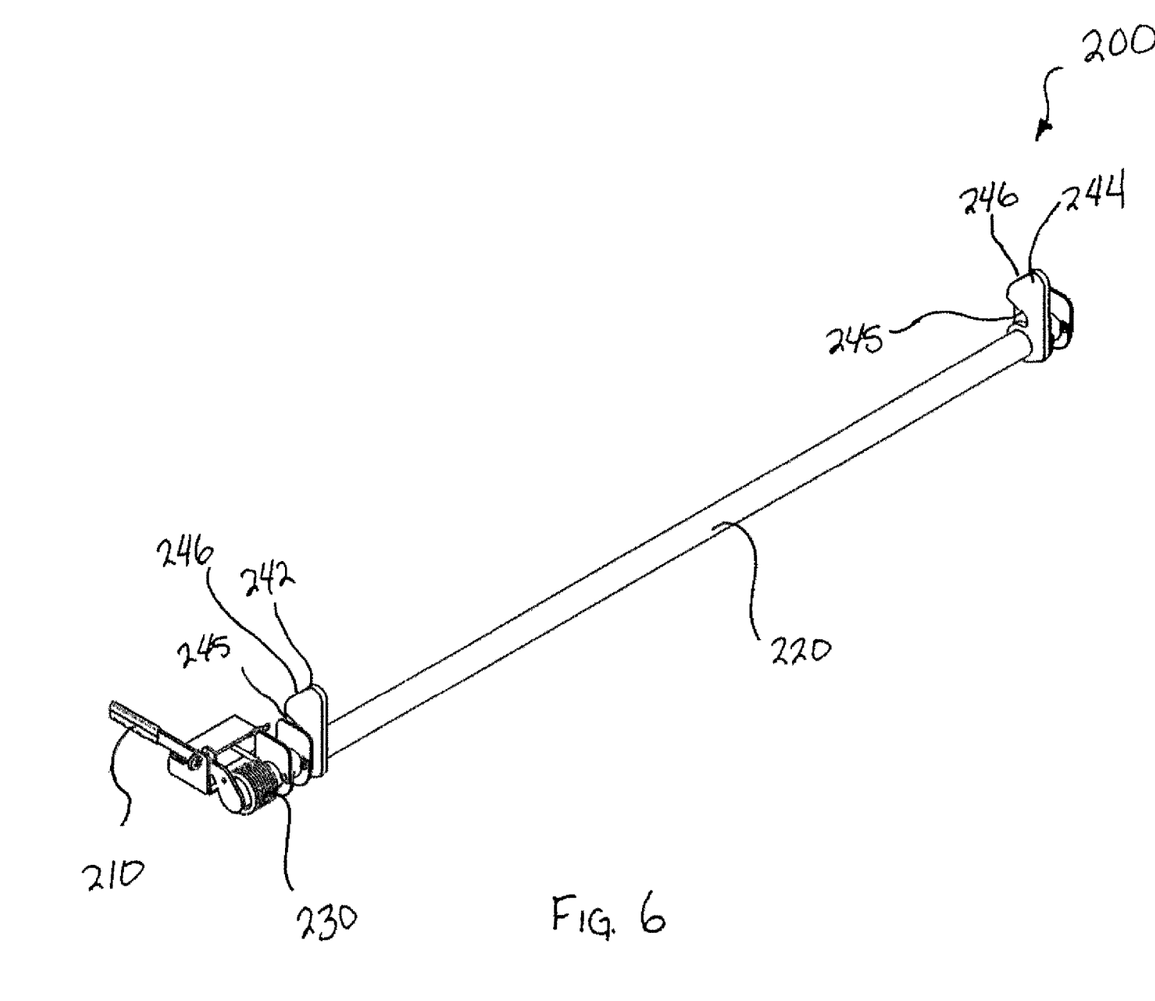
FIG. 6 is a perspective view of the latching assembly isolated from the trailer.

The latching assembly 200 can include a single lever 210, a rod 220, a biasing element 230, a first latching member 242 and a second latching member 244. The latching assembly 200 allows a single operator to disengage the front end 16 of the tilting bed portion 140 by using only the single lever 210. If the pivot axis is positioned between the front end 16 of the tilting bed portion 140 and the center of gravity of the tilting bed portion 140, the tilting bed portion 140 will be biased towards the second position or loading position and the tilting bed portion 140 will pivot once the latching assembly 200 is disengaged so that the back end 18 of the tilting bed portion 140 will move downwards towards the ground surface.

The lever 210 can be attached to the rod 220 and the rod 220 can be positioned running between a first side rail 52 to a second side rail 54. In one aspect, the rod 220 can extend beyond the first side rail 52 so that the lever 210 can be positioned adjacent to the first side rail 52 and outside the frame 30.

The first latching member 242 and the second latching member 244 can be attached to the rod 220 so that they extend upwards towards the tilting bed portion 140. Keepers 252, 254 can be provided extending from the tilting bed portion 140 to engage with the first latching member 242 and the second latching member 244. In one aspect, the first keeper 252 can extend laterally from the outer surface 73 of the first pivoting rail 72 and the second keeper 264 can extend laterally from the outer surface 75 of the second pivoting rail 74.

The first latching member 242 can be attached to the rod 220 so that the first latching member 242 extends upwards between first side rail 52 and the first pivoting rail 72 when the tilt bed trailer 10 is in the transport position to engage the first keeper 252 extending laterally from the outer surface 73 of the first pivoting rail 72 towards the first side rail 52. The second latching member 244 can be attached to the rod 220 so that the second latching member 244 extends upwards between second side rail 54 and the second pivoting rail 74 when the tilt bed trailer 10 is in the transport position to engage the second keeper 254 extending laterally from the outer surface 75 of the second pivoting rail 74 towards the second side rail 54.

The first latching member 242 and the second latching member 244 can have a catch notch 245 and an angled top 246. The first keeper 252 and the second keeper 254 can be received in the catch notch 245.

The biasing element 230 can be used to place a torsional force on the rod 220 so that the first latching member 242 and the second latching member 244 are biased towards the first keeper 252 and the second keeper 254, respectively, so that the catch notches 245 on the first latching element 242 and the second latching element 244 are forced onto the first keeper 252 and the second keeper 254 by the biasing element 230. The angled top 246 of the first latching member 242 and the second latching member 244 can be used to force the first latching member 242 and the second latch member 244 over, against the biasing force applied by the biasing element 230 on the rod 220, so that the first keeper 252 and the second keeper 254 can be forced along the angled top 246 rotating the first latching member 242 and the second latching member 244 and the rod 220 they are attached to until the keepers 252, 254 slide into the catch notches 245 in the first latching member 242 and the second latching member 244.

In one aspect, the biasing element 230 can be a torsion spring.

Figure 7:
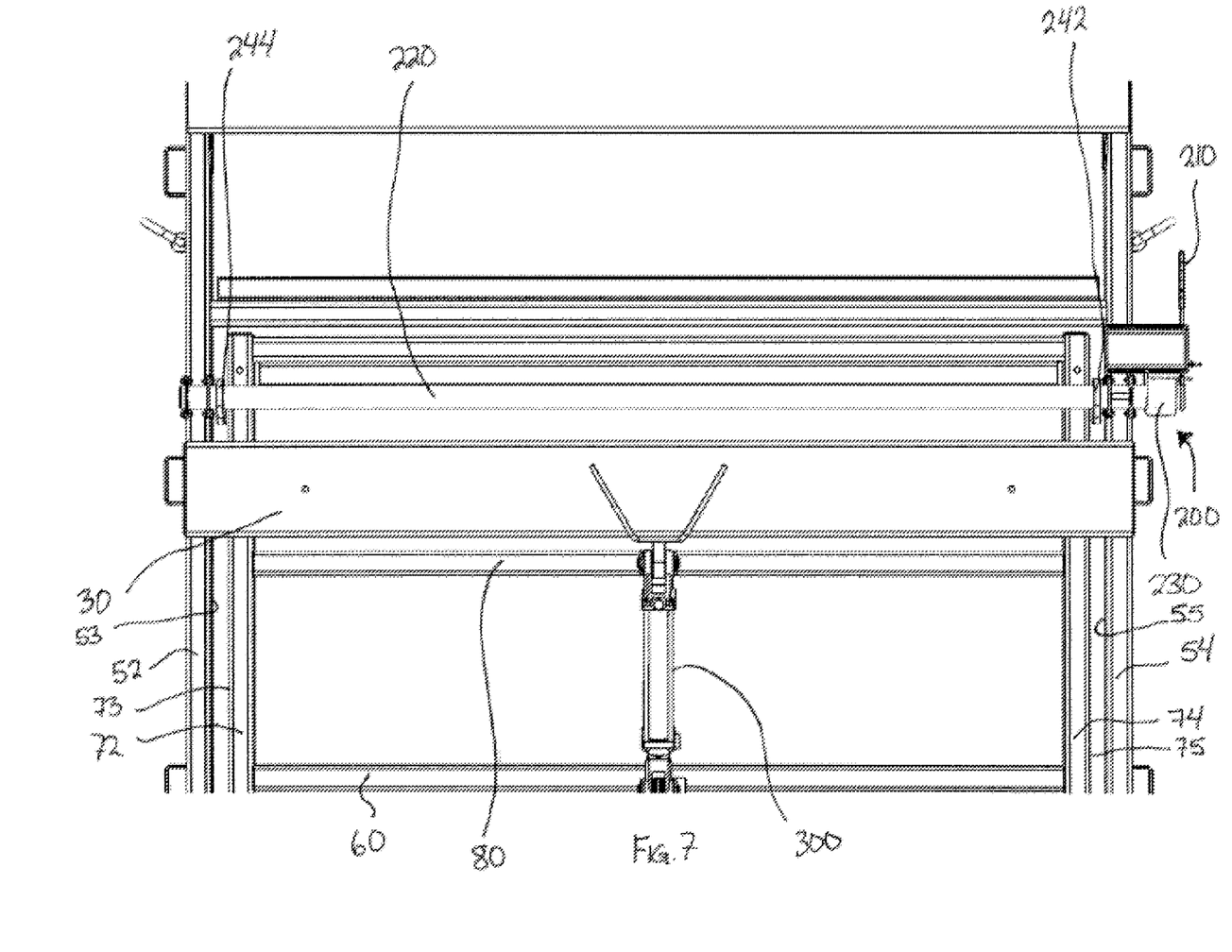
FIG. 7 is a partial bottom view of the trailer showing the latching assembly.
Figure 8:
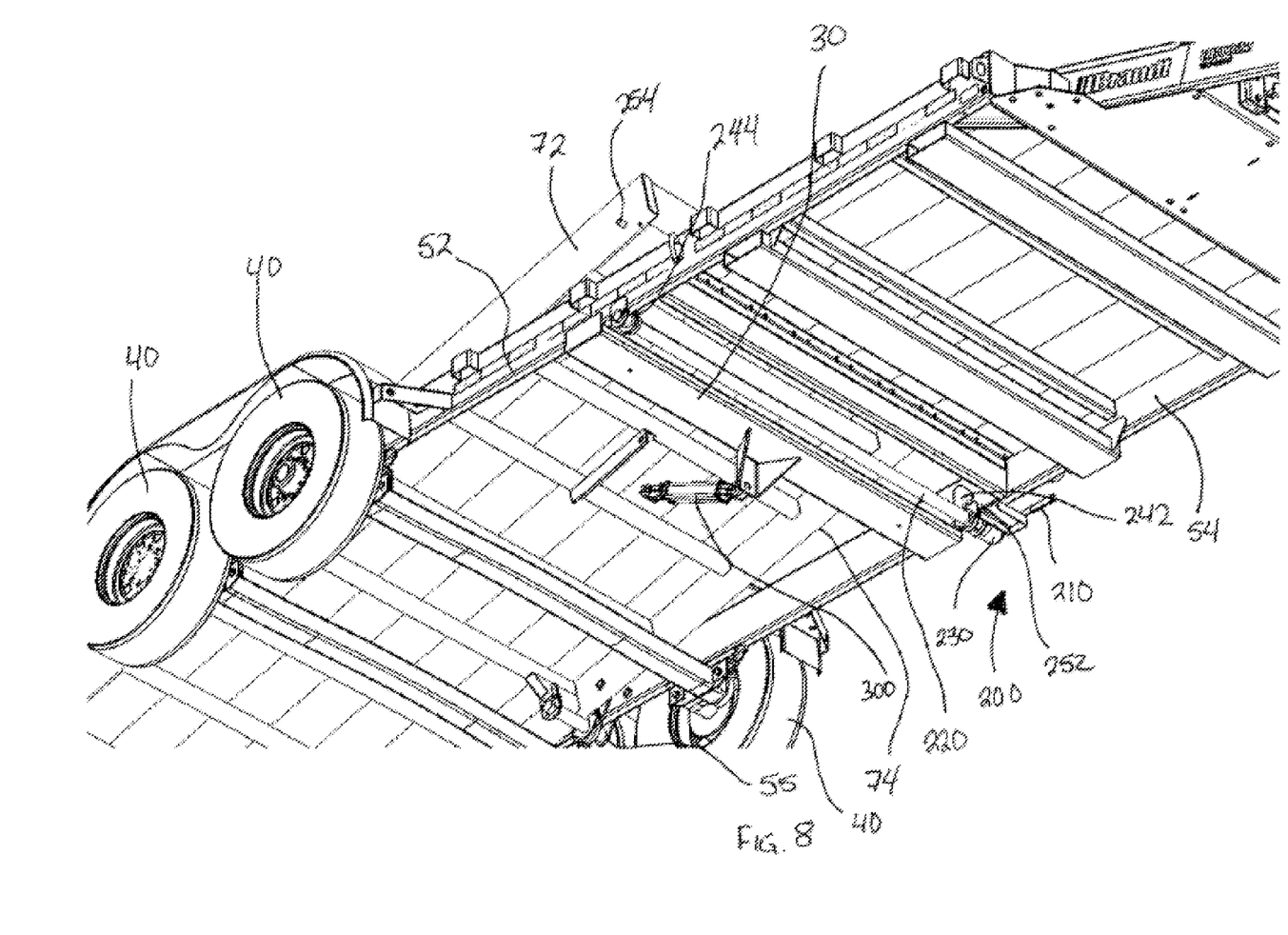
FIG. 8 is a partial bottom perspective view of the trailer.

Referring to FIGS. 7 and 8, a damper 300 can be provided between the tilting bed portion 140 and the frame 30 to dampen the rotation of the tilting bed portion 140 and prevent the tilting bed portion 140 from rotating around the pivot axis too fast and contacting the rest of the trailer 10 too hard and/or fast when it is rotated into the first position.

In operation, an operator can pull the lever 210 to force the rod 220 to rotate against the force of the biasing element 230 causing the first latching member 242 and the second latching member 244 to rotate away from the first keeper 252 and the second keeper 254, respectively, so that the catch notches 245 pull away from the keepers 252, 254 and the keepers 252, 254 are withdrawn from the catch notches 245. With the latching assembly 200 no longer holding on to the keepers 252, 254, the tilting bed portion 140 of the trailer 10 is free to rotate around the pivot axis. If the connection points 56 are not on the center of gravity of the tilting bed portion 140 and instead are positioned towards the front end 16 of the tilting bed portion 140, using the lever 210 to disengage the first latching element 242 and the second latching element 244 from the keepers 252, 254 will cause the tilting bed portion 140 to rotate into the second or loading position with the back end 18 of the tilting bed portion 140 rotated towards the ground surface.

A vehicle can then be driven up the tilted bed portion 140, with the angled tilted bed portion 140 forming a ramp, the vehicle can be driven up the angled tilted bed portion 140. When the vehicle's center of mass reaches the pivot axis and starts to pass the pivot axis, the tilting bed portion 140 will begin to rotate back towards the first position. The damper 300 can prevent this rotation from occurring too fast.

The tilting bed portion 140 can rotate until it rotates inline with the fixed bed portion 100 placing the trailer 10 back in the first position. The first keeper 252 and the second keeper 254 will come down on top of the first latching element 242 and the second element 244, respectively, and the angled top 246 on the first latching member 242 and the second latching member 244 will force the first latching member 242 and the second latching member 244 away from the first keeper 252 and the second keeper 254 and the rod 220 against the biasing element 230 until the keepers 252, 254 pass the angled tops 246 and slide into the catch notches 245. The biasing element 230 will once again force the first latching member 242 and the second latching member 244 against the keepers 252, 254 keeping the keepers 252, 254 in the catch notches 245 of the first latching member 242 and the second latching member 244. This will secure the tilting bed portion 140 in the first position until the operator once again pulls the lever 210 to disengage the latching assembly 200 from the tilting bed portion 140.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A tilt bed trailer comprising:
    a frame having a front end and a back end, the frame comprising a first side rail and a second side rail, the first side rail spaced apart and parallel to the second side rail;
    a hitch attachment connected to the front end of the frame;
    ground wheels attached to the frame;
    a tilting bed portion comprising a first pivoting rail and a second pivoting rail, the first pivoting rail spaced apart and parallel to the second pivoting rail, the first pivoting rail provided adjacent to and inside the first side rail and pivotally connected to the first side rail, the second pivoting rail provided adjacent to and inside the second side rail and pivotally connected to the second side rail, such that the tilting bed portion can pivot relative to the frame around a pivot axis, the tilting bed portion extending behind the back end of the frame;
    keeper extending laterally from one of the first pivoting frame rail and the second pivoting rail; and
    a latching assembly comprising:
        a rod extending between the first side rail and the second side rail and extending beyond the first side rail;
        a lever connected to the rod where the rod extends beyond the first side rail, the lever operative to rotate the rod;
        at least one latching member connected to the rod and engageable with the keeper; and
        a biasing element placing a torsional force on the rod and forcing the at least one latching member against the keeper,
    wherein the at least one latching member has a catch notch sized to receive the keeper,
    and wherein the at least one latching member has an angled top to force a rotation of the rod against the torsional force supplied by the biasing element.

2. The tilt bed trailer of claim 1 wherein the tilting bed can be moved between a loading positioning where the tilting bed is rotated around the pivot axis relative to the frame and a transport position where the tilting bed is positioned in substantially the same plane as the first side rail and the second side rail of the frame.

3. The tilt bed trailer of claim 1 further comprising a fixed bed portion provided proximate a front end of the frame.

4. The tilt bed trailer of claim 3 further comprising fixed bed cross members extending laterally between the first side rail and the second side rail in the fixed bed portion.

5. The tilt bed trailer of claim 4 wherein decking is provided over the fixed bed cross members to form the fixed bed portion.

6. The tilt bed trailer of claim 1 wherein tilting bed cross members extend laterally between the first pivot rail and the second pivot rail.

7. The tilt bed trailer of claim 6 wherein decking is provided over the tilting bed cross members to form the tilted bed portion.

8. The tilt bed trailer of claim 1 wherein the latching assembly comprises a single lever.

9. The tilt bed trailer of claim 8 wherein the single lever is positioned outside the frame.

10. The tilt bed trailer of claim 1 wherein a first keeper extends laterally from an outside surface of the first pivoting rail and a second keeper extends laterally from an outside surface of the second pivoting rail.

11. The tilt bed trailer of claim 10 wherein a first latching member extends upwards between the first frame rail and the first pivoting rail to engage with the first keeper and a second latching member extends upwards between the second frame rail and the second pivoting rail to engage with the second keeper.

12. The tilt bed trailer of claim 1 wherein the biasing element is a torsion spring.

13. The tilt bed trailer of claim 1 further comprising a damper operatively connected between the tilt bed portion and the frame.

\* \* \* \* \*

UNITED STATES PATENT AND TRADEMARK OFFICE
CERTIFICATE OF CORRECTION

| | |
|---|---|
| PATENT NO. | : 10,752,148 B2 |
| APPLICATION NO. | : 15/617156 |
| DATED | : August 25, 2020 |
| INVENTOR(S) | : Mark Selzer |

It is certified that error appears in the above-identified patent and that said Letters Patent is hereby corrected as shown below:

In the Claims

Column 6, Line 33, reads "be moved between a loading positioning where the ..." which should be deleted and replaced with "be moved between a loading position where the ..."

Signed and Sealed this
Tenth Day of November, 2020

Andrei Iancu
*Director of the United States Patent and Trademark Office*